United States Patent [19]

Kröger

[11] 3,826,356
[45] July 30, 1974

[54] VIBRATORY CHUTE
[75] Inventor: Dietrich Kröger, Breckenheim, Germany
[73] Assignee: Firma Jean Netter, Weisbaden, Germany
[22] Filed: July 3, 1972
[21] Appl. No.: 268,680

[30] Foreign Application Priority Data
July 7, 1971  Germany............................ 2133838

[52] U.S. Cl. ............... 198/220 CA, 198/220 BA, 198/220 DA
[51] Int. Cl. ............................................. B65g 27/00
[58] Field of Search...198/220 BA, 220 CA, 220 DA

[56] References Cited
UNITED STATES PATENTS
1,204,522  11/1916  Wall............................ 198/220 DA
2,682,332  6/1954  Isbell.............................. 198/106

FOREIGN PATENTS OR APPLICATIONS
1,260,375  2/1968  Germany...................... 198/220 DA
210,209  8/1907  Germany...................... 198/220 CB Primary Examiner—Richard A. Schacher
Assistant Examiner—Richard K. Thomson

[57] ABSTRACT

A vibratory chute is disclosed with a material transporting surface, such as a trough, that is suspended in the manner of a pendulum and that is thrust into sudden swinging movement and suddenly decelerated thereafter by a drive means, e.g., in the form of a piston rod with a buffer.

1 Claim, 3 Drawing Figures

Fig. 1
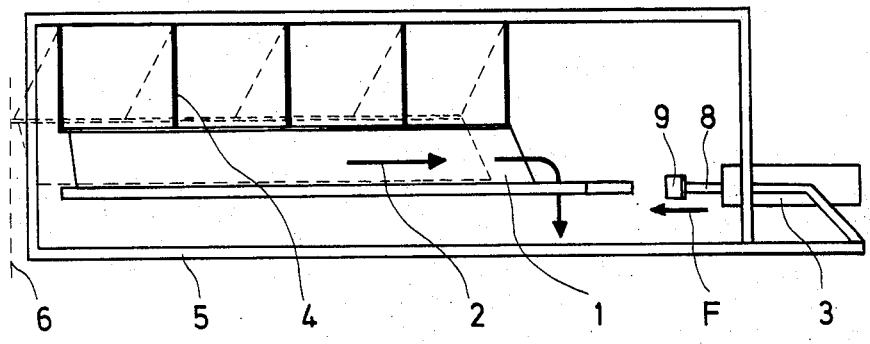
Fig. 2
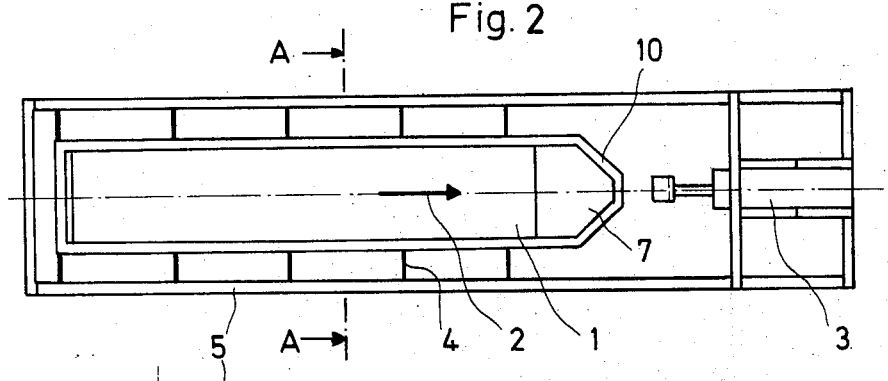
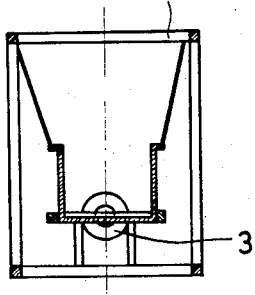
Fig. 3

3,826,356

VIBRATORY CHUTE

BACKGROUND OF THE INVENTION

This invention relates to a vibratory chute whose transport surface, e.g., a channel or trough, can be set into non-uniform reciprocal motion in longitudinal direction thereof, by means of a driving means.

It is well known that vibratory chutes belong to the so-called vibrating conveyors, as far as their system is concerned. The vibratory chute is characterized in that the so-called "coefficient of projection or throw" is always smaller than one, i.e. the material to be transported always remains in contact with the transport surface during the transport operation. The design is such that the maximum acceleration normally takes place during the forward travel such that the frictional contact between the material to be transported and the transport surface is not counteracted — the material is thus advanced at chute speed. However, upon deceleration of the chute when travelling forward or during the return travel, the frictional contact is overcome and the material conveyed is slidingly advanced on the transport surface in the direction of transport, due to its mass. As drive means, for example cam disc gears or similar gear units are used, for creating different acceleration rates for the forward and return travel.

This type of vibratory chute serves for transporting bulky, granular or even powdered material.

This type of vibratory chute, however, cannot be used to transport slurry-like or jelly-like material, i.e., wobbling material.

Other vibrating conveyors, namely vibrating conveyor troughs, cannot be used to convey such slurry-like materials either. In the case of these oscillating troughs, in addition to the swinging movement in the direction of transport, a component of movement is present which is perpendicular relative to said swinging movement, such that the trough and material are lifted during forward travel and the maximum vertical acceleration is greater than the acceleration due to gravity. Hence, the material to be conveyed is raised from the channel bottom in the case of the oscillating troughs as soon as the vertical, downwardly directed trough acceleration exceeds the acceleration due to gravity. The material is transported primarily in so-called microjumps and only briefly comes in contact with the channel during each swinging period. It is obvious that slurry-like material cannot be transported by such oscillating channels.

It is, therefore, an object of the invention to provide a vibratory chute of the type hereinbefore described, which is constructed so that also slurry-like or jelly-like materials having a coherent consistency can be conveyed therewith.

BRIEF SUMMARY OF THE INVENTION

The vibratory chute according to the present invention has a transport surface which is suspended in the manner of a pendulum and the drive means therefor thrusts the pendulum into sudden swinging movement and decelerates it again suddenly after a free swinging movement (forward and return travel).

BRIEF DESCRIPTION OF THE DRAWING

The drawing diagrammatically illustrates one exemplary embodiment of the inventive concept:

FIG. 1 is a side elevation of the vibratory chute,

FIG. 2 is a plan elevation of the chute, and

FIG. 3 is a sectional elevation through said chute along the line A—A in FIG. 2.

DETAILED DESCRIPTION OF A PREFERRED EMBODIMENT

The vibratory chute shown in FIGS. 1 to 3 has a trough 1 which is suspended from a frame 5 by means of ropes, bars or chains 4 such that the trough can be swung in the longitudinal direction, i.e., in the direction of transport in accordance with arrow 2. Trough 1 forms a pendulum which is swung parallel to itself in longitudinal direction during the swinging movement, the trough varying its position as to height in so doing. An opening 7 is located in the base at the end of trough 1 — as seen in the direction of transport — through which opening the material to be transported falls downwardly in the direction of the arrow to the right of arrow 2, in FIG. 1.

A drive cylinder 3 is journaled on the frame 5. The piston rod 8 of the drive cylinder is extended in the direction of the trough 1 and has a buffer 9 at its end. When the drive cylinder is actuated, the piston rod 8 is thrust in the direction of the arrow F and the buffer 9 impinges on the end 10 of the trough base. With the aid of profiles this trough end is so rigid that end 10 is not deformed when struck by buffer 9. The thrust imparts a pendulum movement to the trough so that it attains in its forward travel a position shown by the dash-lines in FIG. 1, the amplitude of the pendulum swing being indicated at 6.

The trough returns from the end position 6 due to the force of gravity and impinges on the buffer 9 before completing the backward travel. The buffer 9 abruptly decelerates the pendulum movement of the trough and subsequently imparts a new pendulum movement to the trough with a new thrust in the direction of the arrow F. The material to be conveyed which is located in the trough in spite of its consistency completes a relative movement with respect to the trough in the direction of transport corresponding to arrow 2, during each thrust-drive or each thrust-braking. While the trough is swinging freely, however, the trough forms together with the material to be conveyed the pendulum which is uniformly affected by the force of gravity so that no relative movement between the material to be conveyed and the trough can take place during this pendulum movement.

The base of the trough 1 is of course designed to be as smooth as possible in order to keep the friction between the material to be conveyed and the base at as low as a level as possible.

It is to be understood that not only a bar 8 (as shown), but also a rope can be used as a driving means. Other means of a known type can also be used to thrust the trough to start the swinging movement. It is also possible to design and arrange the means for braking the trough separately from the means for driving the same.

The transport speed may be controlled by correspondingly varying the length of the ropes 4, or can be influenced by relocating the braking point thereby increasing the amount of thrust.

The length of the trough is basically limited only by the one condition that it can be set into swinging movement by the thrust of the piston rod. It is also possible to move the trough by applying several thrust pulses in the same direction, but at different locations on the trough at the same time if this should be necessary due to the length of the trough.

The drive cylinder 3 can also be suspended as a pendulum in order not to exert any thrust force on the frame 5 of the vibratory chute. In this way, the thrust energy is not diverted to the frame, but is substantially stored. In so doing, however, the lengths and dimensions of the two pendulums must be matched to one another.

The drive means can be automatically controlled by conventional means (e.g., by light or sound barriers, cylinders oscillating in synchronism with the pendulum and similar means).

If the material is supposed to be transported in a corrosive atmosphere or in a very hot ambience, the drive means can be arranged outside of the space where the material is conveyed while only a rod which projects into said space through seals transmits the thrust movement.

The vibratory chute can be especially expediently employed in conjunction with scales because the movement of the vibratory chute is stopped immediately, i.e., the material transported is also stopped immediately, as soon as the brake and the drive means are withdrawn from the operative range of the end 10 of the trough.

As will be evident from the above, due to the measures described, not only granular, powdery and the like material but also slurry-like or jelly-like material may be transported with the vibratory chute according to the invention. Due to its mass inertia and the relatively small amount of friction between the material and the transport surface, this material cannot follow the thrust of the transport surface so that a relative movement between the material to be conveyed and the transport surface results, i.e., the material to be conveyed slides along the transport surface opposite the direction of the thrust. The transport surface which is suspended as a pendulum, however, is also set into swinging motion by the thrust. The speed of the material to be transported approaches the speed of the transport surface during the oscillation. This is accomplished on the one hand by means of the force which is transferred by the forces of friction present and on the other hand by the fact that the movement of the transport surface becomes slower. When the pendulum has completed forward travel, the material to be transported and the transport surface have the same speed so that the material to be conveyed does not continue sliding in the direction of oscillation when the transport surface is stopped, i.e., changes from forward to return travel, since the material has become part of the pendulum itself. A slight increase of the frictional force between the material to be transported and the transport surface also results due to the vertical movement of the transport surface, i.e., the lifting of the material to be transported. During return travel, the transport surface and hence the conveyed material, which forms a unit therewith, are uniformly accelerated due to the force of gravity so that there is no relative movement. The transport surface is then abruptly decelerated at the end of return travel with the aid of the drive means or by a separate brake. In so doing, the transported material executes a relative movement in the direction of transport due to its mass inertia and while overcoming the forces of friction again. The transport surface is of course decelerated before it completes the return travel, i.e. at a time at which the pendulum together with the transported material still have sufficient speed. Thereafter, the thrust of the pendulum is repeated so that the described process is repeated again and again.

Although a preferred embodiment has been described above, it is to be understood that the scope of protection is solely determined by the attached claims.

I claim:

1. A thrust conveyor comprising a material transporting conveyor surface, means for supporting said surface like a pendulum, driving means for imparting swinging pendulum movement to said conveyor surface, and a buffer for abruptly stopping the conveyor surface after a pendulum movement in the direction of transport, said driving means comprising a cylinder-piston system having a cylinder and a piston rod projecting therefrom, said buffer being disposed on the free end of said piston rod, said driving means being disposed such as to engage said conveyor surface after the latter has been abruptly stopped by said buffer and to push the same in a direction opposite to the direction of transport and thereafter to release said surface both for a free pendulum movement in a direction opposite to the direction of transport and a free pendulum return movement in the direction of transport.

* * * * *